Patented Aug. 10, 1937

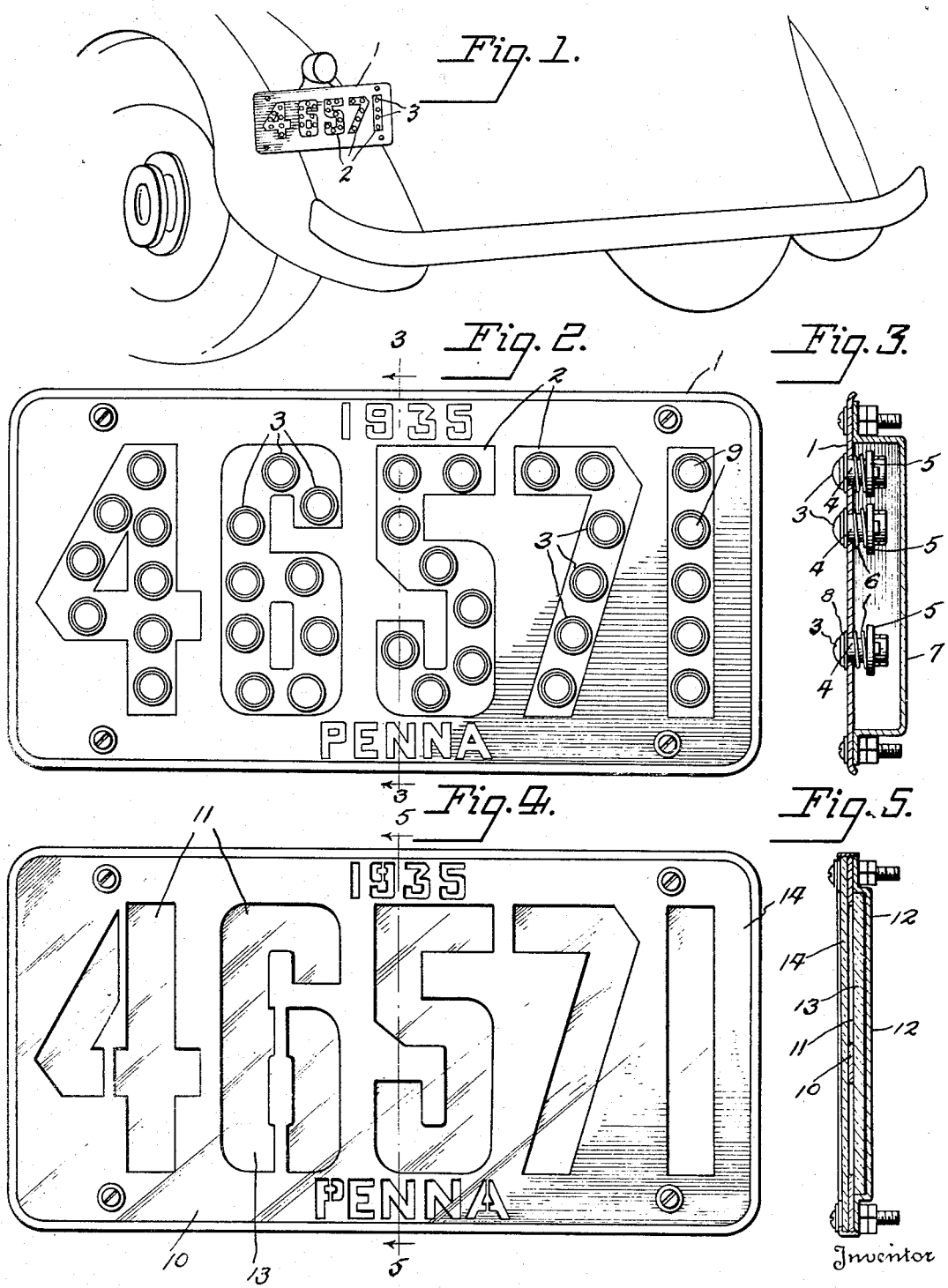

2,089,905

UNITED STATES PATENT OFFICE 2,089,905

REFLECTIVELY ILLUMINATED LICENSE TAG FOR AUTO VEHICLES

Lester L. Lewis, Bellevue, Pa.

Application January 14, 1936, Serial No. 59,130

1 Claim. (Cl. 40—125)

This invention has for its object the enhancement of safety in automobile traffic by the provision of a reflectively illuminated license tag in which the numerals, letters, and/or other indicia on said tags are made visible to an on-coming or overtaking vehicle by reflection of the beam from the headlamps of the approaching vehicle.

Other objects of the invention will appear as the following description of preferred and practical embodiments thereof proceeds.

In the drawing in which the same characters of reference have been employed to designate identical parts:

Figure 1 is a perspective view showing a license tag embodying the principle of my invention on the rear of an automobile;

Figure 2 is a plan view of one form of my invention;

Figure 3 is a section taken along the line 3—3 of Figure 2;

Figure 4 is a plan view of another form of my invention; and

Figure 5 is a section taken along the line 5—5 of Figure 4.

Before adverting in detail to the several figures, it may be stated that carelessness in driving in many instances is provoked through the fact that the driver of the automobile knows that the number on his license tags is invisible at night beyond a very short distance from his vehicle so that he is practically immune from detection by the officers of the law. License tags with perforated numerals have been proposed illuminated by a lamp or lamps in a casing at the rear of the license tag, but such devices are not only expensive to install and maintain, but are unreliable on account of the occasional burning out of light bulbs and the carelessness of motorists in replacing a dead bulb. Moreover, those who are intent upon violation of traffic regulations have it within their power in license tags of this nature to purposely keep them unlighted and so defeat the very object for which they are provided.

The present invention provides a license tag which is entirely independent of any act or intention of the driver for its operation, being one hundred percent automatic and depending altogether upon the headlamps of the approaching vehicle for its operation.

Referring now to that form of the invention illustrated in Figures 2 and 3, the numeral 1 represents the license plate, 2 designating the painted or printed numeral indicia which are visible by day, said indicia being studded with a plurality of reflective buttons 3, said buttons being positioned at sufficiently close intervals to clearly outline the numerals at night. The buttons 3 are of any suitable construction which does not concern the present invention and are secured to the license plate in any manner. As here shown, the buttons consist of two separable parts 4 and 5, one of which has a shank passing through perforations in the license plate and the other being secured to the shank on the other side of the license plate by a lug and slot connection, a spring 6 intervening so as to prevent the parts becoming inadvertently detached. A suitable casing 7 encloses the rear portions of the studs and protects them from meddling.

The exposed part 4 of the stud contains a mirror 8 overlain by a lens 9 secured to the stud in dust-tight manner so as to maintain the brilliance of the mirror.

The operation of a license tag of this type is obvious. When approached from the rear by a vehicle, the number on the license tag is made visible to the operator of the approaching vehicle while yet a great way off, by reflection from the mirrors and through the lenses of the light beam from the headlamp of the approaching vehicle. Thus an officer of the law is able with certainty to read the license numbers of offending vehicles which otherwise would escape through obscurity of the indicia on the license plate.

It is contemplated that license tags embodying the present invention shall be placed both on the front and rear of the vehicle. When placed on the front they are particularly valuable to vehicles approaching from the opposite direction in enabling the drivers of such vehicles to ascertain whether or not their headlights are blinding traffic on the opposite side of the road. If illuminated license tags on the fronts of vehicles flash into the eyes of a driver going in the opposite direction, he knows that his headlight beam is bothering the drivers on the opposite side and can adjust his beam accordingly. When he cannot see the indicia on the approaching license tags, he knows that his lamp beam is safe.

Since the principle of reflection of light from a mirror is that the angle of reflection is equal to the angle of incidence, it seems quite essential in order for drivers on one side of the road to see the reflection from license tags approaching on the opposite side of the road that the mirrors be overlain with lenses so as to bend the reflected rays back in the direction from which the headlamp beam emanates.

Figures 4 and 5 illustrate a simplified embodiment of the invention in which the license plate 10 has cut out numerals 11. A casing 12 is in marginal contact with the back of the license plate and has the greater portion of its back wall recessed to receive a plane mirror 13 of less length and width than the license plate. Flanges, projecting from the back wall of the casing closely embrace the outer edges of the license plate and a glass sheet 14. The glass plate 14 covers the front of the license plate and cut-out numerals and protects the mirror from being obscured by dust. The casing 12, license plate 10, and glass sheet 14 are bored near their corners to receive bolts to hold the entire unit in assembled relation. Such a license tag is equally efficient as that described in connection with Figure 2 on the rear of an automobile in enabling the license number to be reflectively illuminated and thus clearly read from a great distance. Since, however, it does not have a lens or lenses, it is not capable of bending the light rays back toward the direction from which they emanate and is therefore not so useful as the tag described in connection with Figure 2 in assisting drivers to adjust their light beams in deference to on-coming traffic. The license plate illustrated in Figure 4 however has the virtue of simplicity and cheapness and thus lends itself admirably to compulsive use by state law on all motor vehicles.

It is concededly old to provide signs at the roadside of fixed nature and reflectively illuminated by approaching traffic and it is also old to provide reflecting medallions and the like as safety signals on the back of vehicles. However, since the present invention performs a new use in an unsatisfied field in which there has for a long time been a crying need for such a device, it is believed that the adaptation of the invention to moving vehicles in the lanes of traffic, is altogether non-analogous to the use of stationary signs and that the invention is to be construed as a broad concept and not to be limited to any specific means for embodying the inventive idea.

What I claim is:

License tag comprising a plate having cut out identifying numerals, a plane mirror behind and in close contact with said plate and visible through said cut out numerals, a protective transparent sheet in front of and in close contact with said plate and covering the same, a casing embracing the edges of said protective sheet and said plate and having a back recessed to receive said plane mirror, said mirror being of less length and width than said plate and sheet, and bolts passing through said sheet, plate and casing, to hold the elements in close contact, said numerals being visible at night through reflected light from headlight beams.

LESTER L. LEWIS.